(12) United States Patent
Whelan (10) Patent No.: US 11,773,991 B2
(45) Date of Patent: Oct. 3, 2023

(54) FUEL DEMAND VALVE WITH ANTI-SIPHON AND PRESSURE PROTECTION

(71) Applicant: BIG DOG MARINE LLC, Highland, MI (US)

(72) Inventor: Sean Whelan, Highland, MI (US)

(73) Assignee: BIG DOG MARINE LLC, Highland, MI (US)

( * ) Notice: Subject to any disclaimer, the term of this patent is extended or adjusted under 35 U.S.C. 154(b) by 0 days.

(21) Appl. No.: 17/974,219

(22) Filed: Oct. 26, 2022

(65) Prior Publication Data

US 2023/0128683 A1  Apr. 27, 2023

Related U.S. Application Data

(60) Provisional application No. 63/272,469, filed on Oct. 27, 2021.

(51) Int. Cl.
*F16K 15/02*  (2006.01)
*F16K 27/02*  (2006.01)
*F02M 37/00*  (2006.01)

(52) U.S. Cl.
CPC ....... *F16K 15/028* (2013.01); *F02M 37/0011* (2013.01); *F16K 27/0209* (2013.01)

(58) Field of Classification Search
CPC .... F16K 15/025; F16K 15/026; F16K 15/028; F16K 15/08; F16K 15/12; F16K 27/0209; F02M 37/0011; F02M 21/0218; F02M 21/023; F02M 21/0239; F02M 21/0242
See application file for complete search history.

(56) References Cited

U.S. PATENT DOCUMENTS

| | | | | |
|---|---|---|---|---|
| 5,755,252 | A * | 5/1998 | Bergsma ................. | F16K 17/36 137/202 |
| 7,111,625 | B2 * | 9/2006 | Jackson ................. | A62B 9/027 128/201.27 |
| 8,651,068 | B1 | 2/2014 | Torgerud et al. | |
| 2011/0297126 | A1 * | 12/2011 | Akagi ................ | F02M 37/0029 137/511 |
| 2017/0138311 | A1 * | 5/2017 | Hammer ............. | F16K 31/0693 |
| 2019/0368445 | A1 * | 12/2019 | Young ................. | B60K 15/035 |

* cited by examiner

*Primary Examiner* — Grant Moubry
(74) *Attorney, Agent, or Firm* — Clark Hill PLC (57) ABSTRACT

A fuel demand valve that opens with minimal engine suction pressure. The fuel demand valve has an inlet housing and an outlet housing with a valve door in the outlet housing that moves to allow flow through the valve when exposed to a pressure difference sufficient to overcome a spring internal to the outlet housing. The inlet housing includes a shelf, and two gaskets, one large and one small, are disposed between the shelf and the valve door such that they define different surface areas on the valve door. The different surface areas define the amount of force required to be exerted on the valve door for fuel to flow when exposed to fuel supply and engine suction pressures. The different surface areas provide a mechanical advantage whereby lower suction pressure from the engine exerts the same force as a higher fuel supply pressure on the valve door enabling lower fuel pressure operation.

20 Claims, 8 Drawing Sheets

FUEL DEMAND VALVE WITH ANTI-SIPHON AND PRESSURE PROTECTION

BACKGROUND OF THE DISCLOSURE

1. Field of the Disclosure

This disclosure relates to the field of fuel regulation, especially for fuel control for internal combustion engines.

2. Description of the Related Art

Fuel demand valves are used to control the movement of fuel from a pressurized fuel supply tank to an engine. Fuel demand valves are installed in the fuel line between the fuel tank and the engine, often between the fuel tank and the primer bulb, to prevent fuel from flowing absent a demand for fuel from the engine. Fuel demand valves prevent excess fuel from being forced into the fuel line due to pressure in the fuel tank, which can result in engine flooding and potential engine failure.

Typical engine valves manufactured for fuel demand control include a metal ball in a housing with an opening for fuel to enter the housing. A spring biases the ball to block the opening unless pressure across the ball overcomes the spring force on the ball. Thus, pressure from the fuel tank and/or suction from the engine can force the ball to move clear of the opening sufficiently for fuel to flow from the fuel tank to the engine.

Overcoming the spring force holding the ball in place against the opening in the housing limits the ability of the valve to open when fuel tank pressure is low (below about 1 psig) and increases demand on the suction pressure of the engine to enable the valve to open. In that case, if suction pressure generated by the engine is not sufficient, then the engine may stall for lack of fuel. If the spring force is reduced in order to compensate for low engine suction, then the valve may not adequately close due to fuel tank pressure, allowing the engine to become flooded when there is not demand for fuel.

Typical ball and spring arrangements provide a single surface area on the ball where pressure from the fuel supply is applied to force the ball to move against the spring. The pressure applied by the fuel supply and the suction pressure from the engine are both applied to this same surface area.

In U.S. Pat. No. 8,651,068, a spring and ball arrangement is used where the fuel tank pressure and spring force are used to maintain the fuel demand valve in the closed position, requiring the engine suction pressure to overcome both in order for fuel to flow.

What is needed is a fuel demand valve that provides anti-siphon protection in the fuel delivery line for fuel tanks that are up to 1 psig pressure and allows fuel to flow to engine with minimal restriction when the engine demands fuel.

BRIEF SUMMARY OF THE DISCLOSURE

In aspects, the present disclosure is related to fuel demand valves.

One embodiment according to the present disclosure includes an apparatus for controlling fuel flow that includes an inlet housing with an inlet tunnel and a shelf on one side and an opening to receive fuel on another side; an outlet housing including: a widened portion defining a housing chamber and configured to align with the shelf of the inlet housing; and a line portion configured to mate with an engine fuel line; a valve door with a flat side and an opposite side disposed within the housing chamber with a valve door perimeter; a large gasket disposed between the shelf and the valve door with a large gasket inner perimeter and a large gasket outer perimeter, wherein the large gasket outer perimeter is equal to or less than the valve door perimeter; a small gasket disposed between the shelf and the valve door with a small gasket outer perimeter that is less than the large gasket inner perimeter and a small gasket inner perimeter that equal to a perimeter of the inlet tunnel; and a spring disposed between the opposite side of the valve door and the line portion of the outlet housing. The outlet housing may be threaded, and the inlet housing may have a circular wall extending from the shelf that is threaded to mate with the outlet housing. The large gasket outer perimeter defines a large gasket surface area on the valve door and the small gasket inner perimeter defines a small gasket surface area on the valve door such that the ratio of the large gasket surface area to the small gasket surface area is greater than 1, and, in some instances, at least 2. The inlet housing and the outlet housing may be made of plastic, metal, or other suitable materials that will not degrade or swell when exposed to the selected fuel. The spring may be selected based on an operating design pressure of a fuel supply in fluid communication with the inlet housing. The inlet tunnel may be uniform in shape throughout the inlet housing, such as cylindrical. The valve door may be circular in shape.

Another embodiment according to the present disclosure may include a fuel system that includes a fuel supply; a fuel demand valve in fluid communication with the fuel supply; and an engine in fluid communication with the fuel demand valve; wherein the fuel demand valve includes: an inlet housing with an inlet tunnel and a shelf on one side and an opening to receive fuel on another side; an outlet housing including: a widened portion defining a housing chamber and configured to align with the shelf of the inlet housing; and a line portion configured to mate with an engine fuel line; a valve door with a flat side and an opposite side disposed within the housing chamber with a valve door perimeter; a large gasket disposed between the shelf and the valve door with a large gasket inner perimeter and a large gasket outer perimeter, wherein the large gasket outer perimeter is equal to or less than the valve door perimeter; a small gasket disposed between the shelf and the valve door with a small gasket outer perimeter that is less than the large gasket inner perimeter and a small gasket inner perimeter that equal to a perimeter of the inlet tunnel; and a spring disposed between the opposite side of the valve door and the line portion of the outlet housing. The outlet housing may be threaded, and the inlet housing may have a circular wall extending from the shelf that is threaded to mate with the outlet housing. The large gasket outer perimeter defines a large gasket surface area on the valve door and the small gasket inner perimeter defines a small gasket surface area on the valve door such that the ratio of the large gasket surface area to the small gasket surface area is greater than 1, and, in some instances, at least 2. The inlet housing and the outlet housing may be made of plastic, metal, or other suitable materials that will not degrade or swell when exposed to the selected fuel. The spring may be selected based on an operating design pressure of a fuel supply in fluid communication with the inlet housing. The inlet tunnel may be uniform in shape throughout the inlet housing, such as cylindrical. The valve door may be circular in shape.

Another embodiment according to the present disclosure may include a fuel system that includes a fuel supply; a fuel demand valve in fluid communication with the fuel supply;

and an engine in fluid communication with the fuel demand valve; wherein the fuel demand valve includes: an inlet housing with an inlet tunnel and a shelf on one side and an opening to receive fuel on another side; an outlet housing including: a widened portion defining a housing chamber and configured to align with the shelf of the inlet housing; and a line portion configured to mate with an engine fuel line; a valve door with a flat side and an opposite side disposed within the housing chamber with a valve door perimeter; a gasket disposed between the shelf and the valve door with a gasket outer perimeter and an opening with a gasket inner perimeter, wherein the gasket outer perimeter is equal to or less than the valve door perimeter, and wherein the gasket inner perimeter is equal to a perimeter of the inlet tunnel; and a spring disposed between the opposite side of the valve door and the line portion of the outlet housing. The outlet housing may be threaded, and the inlet housing may have a circular wall extending from the shelf that is threaded to mate with the outlet housing. The gasket outer perimeter defines a gasket surface area on the valve door and the opening defines an opening surface area on the valve door such that the ratio of the large gasket surface area to the small gasket surface area is greater than 1, and, in some instances, at least 2. The inlet housing and the outlet housing may be made of plastic, metal, or other suitable materials that will not degrade or swell when exposed to the selected fuel. The spring may be selected based on an operating design pressure of a fuel supply in fluid communication with the inlet housing. The inlet tunnel may be uniform in shape throughout the inlet housing, such as cylindrical. The valve door may be circular in shape.

Examples of the more important features of the disclosure have been summarized rather broadly in order that the detailed description thereof that follows may be better understood and in order that the contributions they represent to the art may be appreciated. There are, of course, additional features of the disclosure that will be described hereinafter and which will form the subject of the claims appended hereto.

BRIEF DESCRIPTION OF THE DRAWINGS

A better understanding of the present disclosure can be obtained with the following detailed descriptions of the various disclosed embodiments in the drawings, which are given by way of illustration only, and thus are not limiting the present disclosure, and wherein.

DETAILED DESCRIPTION OF THE DISCLOSURE

The present disclosure is susceptible to embodiments of different forms. There are shown in the drawings, and herein will be described in detail, specific embodiments with the understanding that the present invention is to be considered an exemplification of the principles and is not intended to limit the present invention to that illustrated and described herein.

DEFINITIONS

Throughout the description, including the claims, the term "comprising one" should be understood as being synonymous with the term "comprising at least one", unless otherwise specified, and "between" should be understood as being inclusive of the limits.

The present disclosure concerns a fuel demand valve that operates in-line with a fuel deliver system between a fuel tank and an engine and opens in response to a low pressure drop (below 1 psig). The valve can operate at low pressures, as would be understood by a person of skill in the art, where, in the absence of sufficient pressure from a fuel supply, the engine suction would be sufficient to open the valve. The engine suction may be sufficient to open the valve when it is only a fraction of the pressure normally supplied by the fuel supply tank because of a mechanical advantage due to the differences in exposed surface areas of a valve door within the valve between the fuel pressure side and the engine suction side of said valve door, as discussed further below.

Further, the valve is contained within a housing that separates it from atmospheric pressure, thus, no pressure reference to atmosphere is required for operation. Rather, the valve operates solely based on the difference between the fuel supply pressure and the engine demand pressure.

Figure 1:
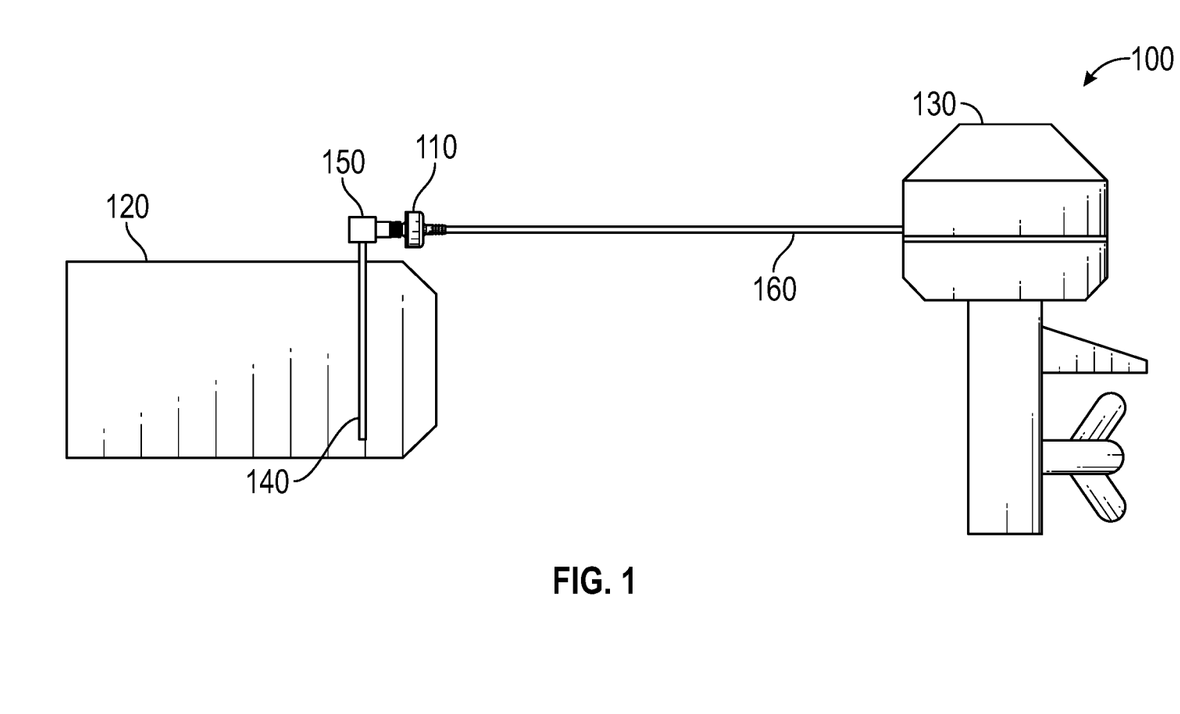
FIG. 1 is diagram of a fuel system including a fuel demand valve according to one embodiment of the present disclosure.

FIG. 1 shows a diagram of a fuel system 100 with a fuel demand valve 110 disposed between a pressurized fuel tank 120 and an engine 130. The pressurized fuel tank 120 may be configured to hold liquids or gasses under pressure. It is also contemplated that the fuel demand valve 110 may operate with pressurized tanks other than fuel tanks. The pressurized fuel tank 120 has a pick-up tube 140 inserted and connected to a threaded connector 150, which is typical in marine fuel tanks. The threaded connector 150 is configured to screw into the top of the pressurized fuel tank 120 and provides an outlet that may mate with the fuel demand valve 110, which means that no fuel supply line is required between the threaded connector 150 and the fuel demand valve in system 100. The absence of a fuel supply line can reduce the risk of leaks and damage caused by having pressure on a fuel supply line outside of the pressurized fuel tank 120 and make it easier to comply with safety requirements for marine fuel systems. The fuel demand valve 110 is in-line with the threaded connector 150 and a fuel line 160 between the fuel demand valve 110 and the engine 130.

Figure 2A:
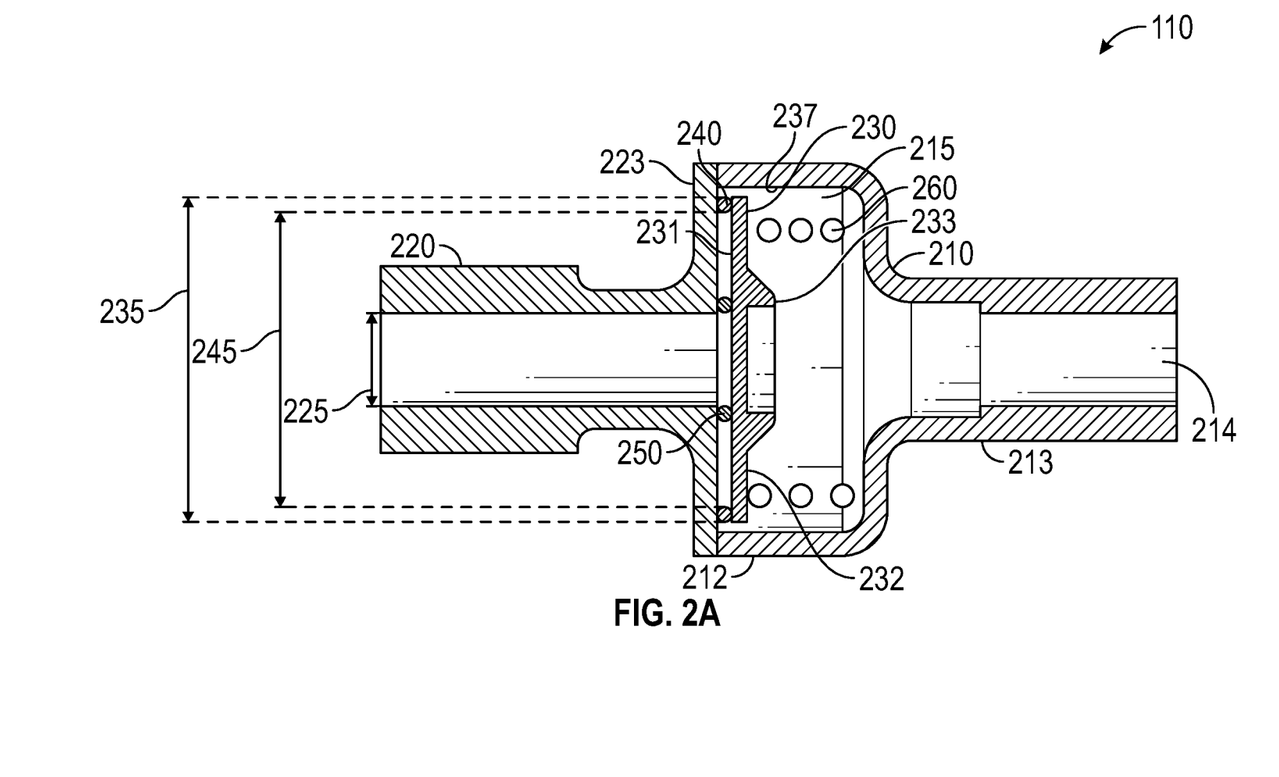
FIG. 2A is cross-sectional diagram of the fuel demand valve of FIG. 1 in a closed position according to one embodiment of the present disclosure.

FIG. 2A a cross-sectional diagram of a fuel demand valve 110 according to the present disclosure. The fuel demand valve 110 includes an outlet housing 210 and an inlet housing 220. The outlet housing 210 may be connected to the engine 130 via the fuel line 160. The inlet housing 220 may include exterior threads and be connected to the treaded connector 150. The outlet housing 210 includes a widened portion 212 and a line portion 213. The widened portion 212 is dimensioned to form a housing chamber 215 large enough to contain a valve door 230. The line portion 213 is dimensioned to attach to the fuel line 160 leading to the engine and has an outlet tunnel 214 in communication with the housing chamber 215. The line portion 213 may include optional threads or barbs to facilitate connection with the fuel line 160. The inlet housing 220 is dimensioned to attach to the threaded connector 150 leading from the pressurized fuel tank 120 on one side and has a shelf 223 dimensioned to seal the widened portion 212 of the outlet housing on the other side. The inlet housing 220 includes an inlet tunnel 225 for passing fuel from the threaded connector 150 to the outlet housing 210.

Within the housing chamber 215 there are disposed a valve door 230, a large gasket 240, a small gasket 250, and a spring 260. The valve door 230 has a flat side 231 positioned to face the shelf 223 and an opposite side 232 facing the away from the shelf 223. The valve door 230 may have any shape, including, but not limited to, circular, polygonal, D-shaped, stadium-shaped, ovular, and any other suitable shape as would be understood by a person of ordinary skill in the art, as long as there is no gap between the valve door 230 and the large gasket 240 for fuel to pass when then valve 110 is in the closed position. The large gasket 240 and the small gasket 250 are positioned in the housing chamber 215 between the flat side 231 of the valve door 230 and the shelf 223. The large gasket 240 has an outer perimeter 235 that defines a surface area $SA_L$ that is equal to or encompassed by a surface area defined by the outer perimeter of the valve door 230. The small gasket 250 may be dimensioned to match the size and shape of an opening of the inlet tunnel 225. In the plane of the flat side 231, the small gasket 250 is completely surrounded by the large gasket 240. The large gasket 240 is disposed between the valve door 230 and the shelf 223 and has an inner perimeter 245 that defines a surface area larger than that of the small gasket 250. As shown, the large gasket 240 and the small gasket 250 may be O-rings. Using O-rings for the large gasket 240 and the small gasket 250 is exemplary and illustrative only, as the large gasket 240 and the small gasket 250 may be of any shape or suitable material, such as an injected molded gasket. The large gasket 240 and the small gasket 250 may or may not have common centers. In some embodiments, the large gasket 240 and the small gasket 250 may be combined to form a single gasket. The valve door 230 may be dimensioned to substantially fill the housing chamber 215 but leaving a gap 237 between the outlet housing 210 and the valve door 230 for fuel to flow when the fuel demand valve 110 is in the open position. The housing chamber 215 may be shaped so as to allow travel of the valve door 230 when the fuel demand valve 110 is moving between its opened and closed configurations. The housing chamber 215, in a plane of the flat side 231 of the valve door 230, may have the same or a different shape with regard to the valve door 230. The spring 260 is disposed within the housing chamber 215 against the opposite side 232 of the valve door 230. The spring 260 is positioned to exert force on the valve door 230 to hold the flat side 231 against the small gasket 250 and the large gasket 240, which prevents flow of fuel from the inlet tunnel 225 into the line portion 213. The spring 260 may be selected based on the force it applies to the valve door 230 such that fuel does not flow through the fuel demand valve 110 when there is no suction pressure provided by the engine 130. The spring 260 may also be selected such that the valve door 230 may move from a closed position (FIG. 2A) to an open position (FIG. 2D) when the suction pressure supplied by the engine 130 is low, such as less than 1 psig. In some embodiments, the valve door 230 may include an optional circular wall 233, and may also, alternatively, receive a spring 460 dimensioned to fit within the perimeter of the circular wall 233 (see FIG. 4A).

The components of the fuel demand valve 110 may be made of metal, plastic, rubber, or other suitable materials that would be known to a person of skill in the art with the requisite strength, tension, and resistance to deterioration due to the environment or the fuel. In some embodiments, the components (i.e., the outlet housing 210, the inlet housing 220, the valve door 230, the large gasket 240, the small gasket 250, and the spring 260) may be selected based on the type of fuel to be transported through the valve.

Figure 2B:
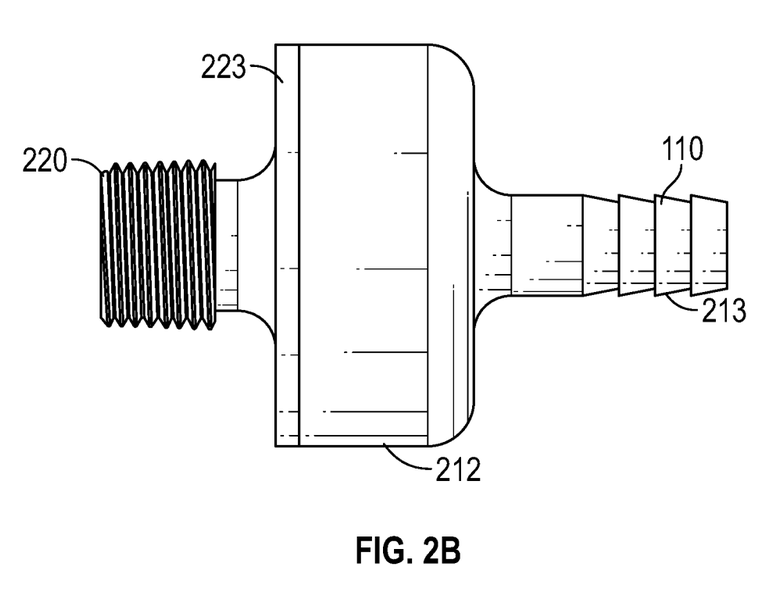
FIG. 2B is a side view of the fuel demand valve in FIG. 1.

FIG. 2B shows a side view of the fuel demand valve 110 of FIG. 1. The shelf 223 is shown as equal to or greater in diameter to the widened portion 212 so that, when joined, there is no opening for fuel to leak from the fuel demand valve 110.

Figure 2C:
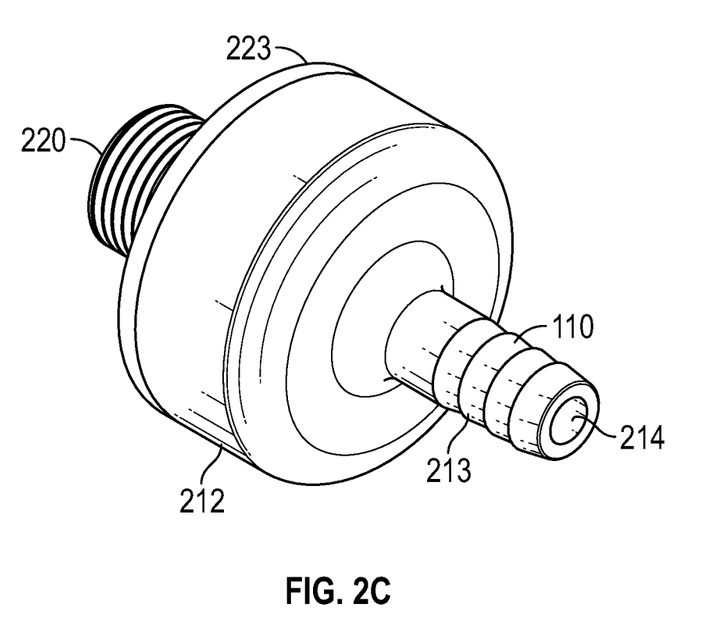
FIG. 2C is a 3-D view of the fuel demand valve in FIG. 1.

FIG. 2C shows a 3-D view of the fuel demand valve 110 of FIG. 1. The widened portion 212 is shown with a cylindrical shape with a greater diameter than the line portion 213; however, the widened portion 212 can be any shape so long as it 1) houses the valve door 230 and allows it to move and 2) mates with the inlet housing 220.

Figure 2D:
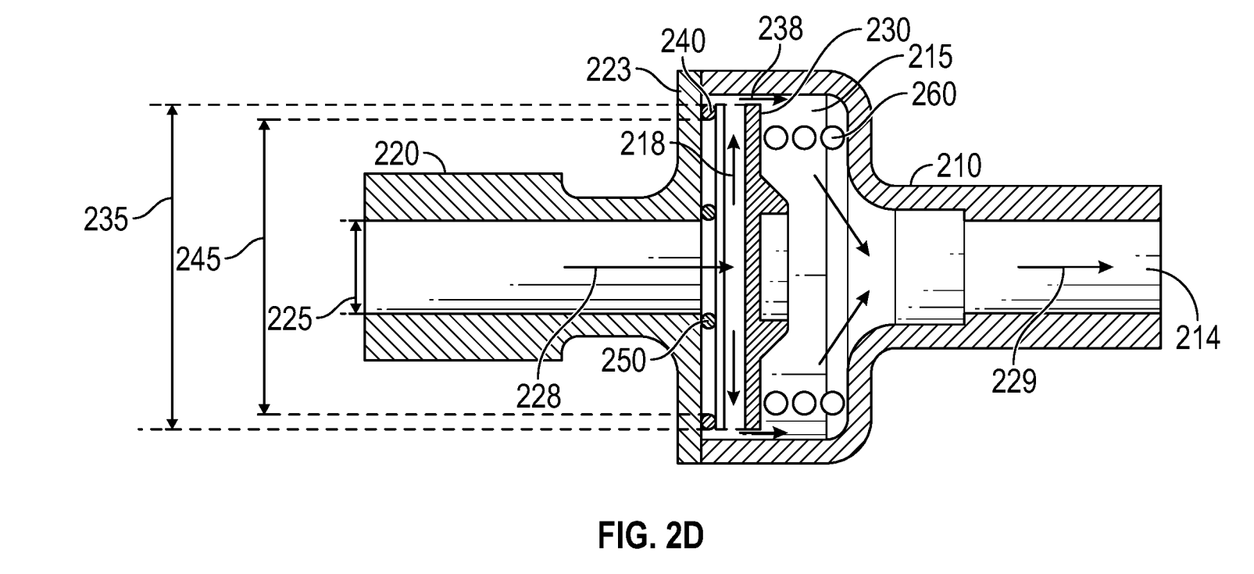
FIG. 2D is a cross-sectional diagram of the fuel demand valve in FIG. 1 in an open position according to one embodiment of the present disclosure.

FIG. 2D shows a diagram of the fuel demand valve 110 with the valve door 230 in an opened position so that fuel is flowing. The fuel flows through the pick-up tube 140 into the threaded connector 150 and then into the fuel demand valve 110 and enters the inlet housing 220. The movement of the fuel through the inlet housing 220 is shown by arrow 228, and the movement of the fuel through the outlet housing 210 is shown by arrow 229. In some embodiments, as shown, the arrow 228 and the arrow 229 may be parallel (e.g. in-line). Force on the valve door 230 transmitted by pressure of the fuel from the fuel tank and suction pressure from the engine 130 overcomes the force of the spring 260 on the valve door 230 and move the valve door 230 away from the large gasket 240 and the small gasket 250, which creates flow paths 218 for fuel to flow radially outward from the opening at the small gasket 250 to the gap 237 (shown by flow arrow 238).

In principle, the fuel demand valve 110 benefits from having a small surface area $SA_S$ of the valve door 230 on the flat side 231 defined by the inner perimeter 225 of the small gasket 250 (which is an inner diameter 225 if the small gasket 250 is circular) and a large surface area $SA_L$ defined by the outer perimeter 235 of the large gasket 240 (which is outer diameter 235 if the large gasket 240 is circular). The force to open the valve door 230 is a combination of the fuel pressure ($P_f$) and the suction pressure ($P_s$) modified by the surface areas ($SA_S$, $SA_L$) on each side of the valve door 230. So, the force to open ($F_O$) formula looks like: $F_O=(P_f \times SA_S)+(P_S \times SA_L)$, and the force to close is provided by spring force $F_S$ due to spring 260. Since $SA_L>SA_S$, a lower $P_S$ against $SA_L$ can deliver the same force as a larger $P_f$ against $SA_S$ in proportion to the ratio of $SA_L:SA_S$. In some embodiments, ratio of $SA_L:SA_S$ is greater than 1:1. In some embodiments, the ratio of $SA_L:SA_S$ is at least 2:1. The greater the ratio of $SA_L:SA_S$, the less suction force is required relative to fuel supply force, making it easier for the engine suction to overcome a pressure shortfall in the pressurized fuel tank 120. This means that when the fuel demand valve 110 is sized for a spring force equal to or slightly below the fuel pressure, then only a small amount of engine suction pressure is required to move the valve door 230, opening the fuel demand valve 110 and allowing fuel to flow. As such, the system 100 does not involve an atmospheric pressure reference in its operation.

Due to the mechanical advantage presented by the different surface areas exposed to the fuel pressure and the suction pressure, a low suction pressure can more easily make up for a deficiency in fuel pressure. So when fuel pressure is low, or specifically below the pressure required to overcome the spring force due to the spring 260, the engine 130 is not required to generate suction pressure to make up for the full deficiency in fuel pressure for the fuel demand valve 110 to open and allow fuel to flow, but rather the engine 130 only needs to supply a fraction of the fuel pressure deficiency, as proportionate to $$\frac{SA_S}{SA_L}.$$

Figure 3:
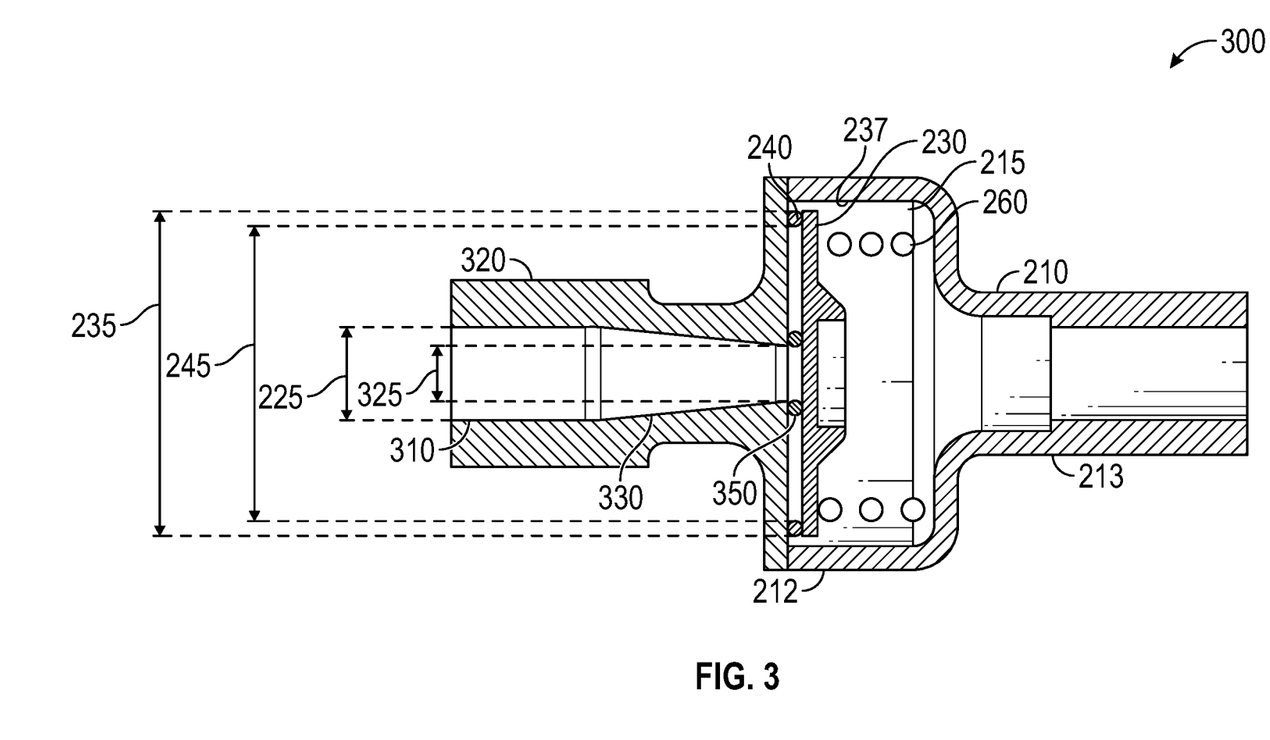
FIG. 3 is a cross-sectional diagram of an alternative fuel demand valve according to another embodiment of the present disclosure.

FIG. 3 shows a diagram of an alternative fuel demand valve 300 that may also be used in the fuel system 100 according to the present disclosure. The fuel demand valve 300 includes the outlet housing 210, the housing chamber 215, the valve door 230 and the large gasket 240; however, the inlet housing 220 has been replaced by inlet housing 320. The inlet housing 320 includes an inlet tunnel 310 with inner perimeter 225 but has a narrowed portion 330 that ends in a smaller inner perimeter 325 that matches a smaller seal 350. The inlet housing 320 may have a threads or barbs to facilitate connection to the threaded connector 150 or the fuel line 610 (see FIG. 6). This results in a reduced surface area on the flat side 231 than the cross section of the inner perimeter 225 where the smaller seal 350 contacts the valve door 230.

Figure 4A:
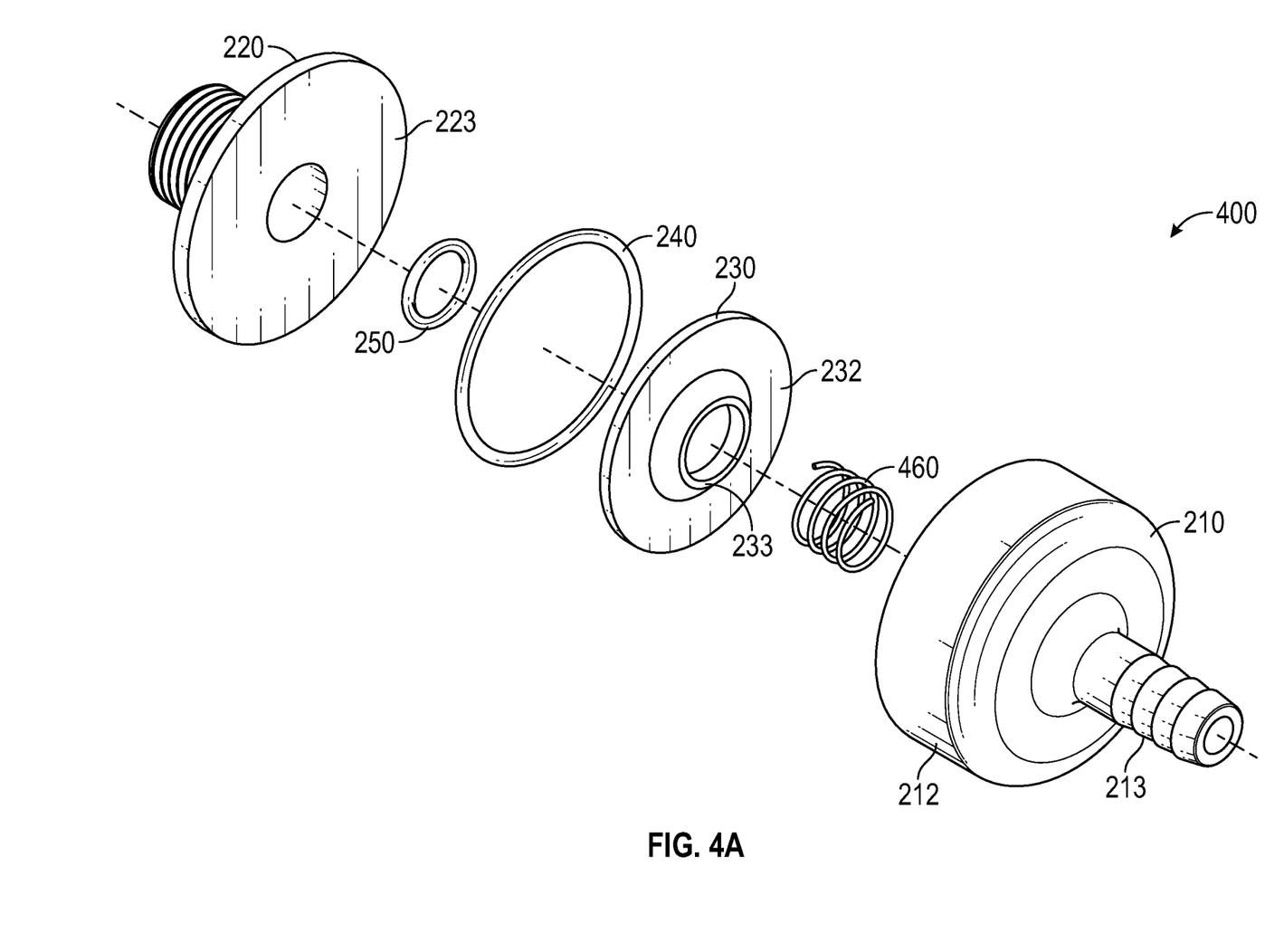
FIG. 4A is an exploded diagram of another alternative fuel demand valve according to another embodiment of the present disclosure.

FIG. 4A shows an exploded diagram of another alternative fuel demand valve 400 that may be used in the fuel system 100 according to the present disclosure. The fuel demand valve 400 includes the outlet housing 210, the inlet housing 220, the small gasket 250, the large gasket 240, and the valve door 230 with optional circular wall 233; however, the spring 460 is positioned to fit within the perimeter of the circular wall 233.

Figure 4B:
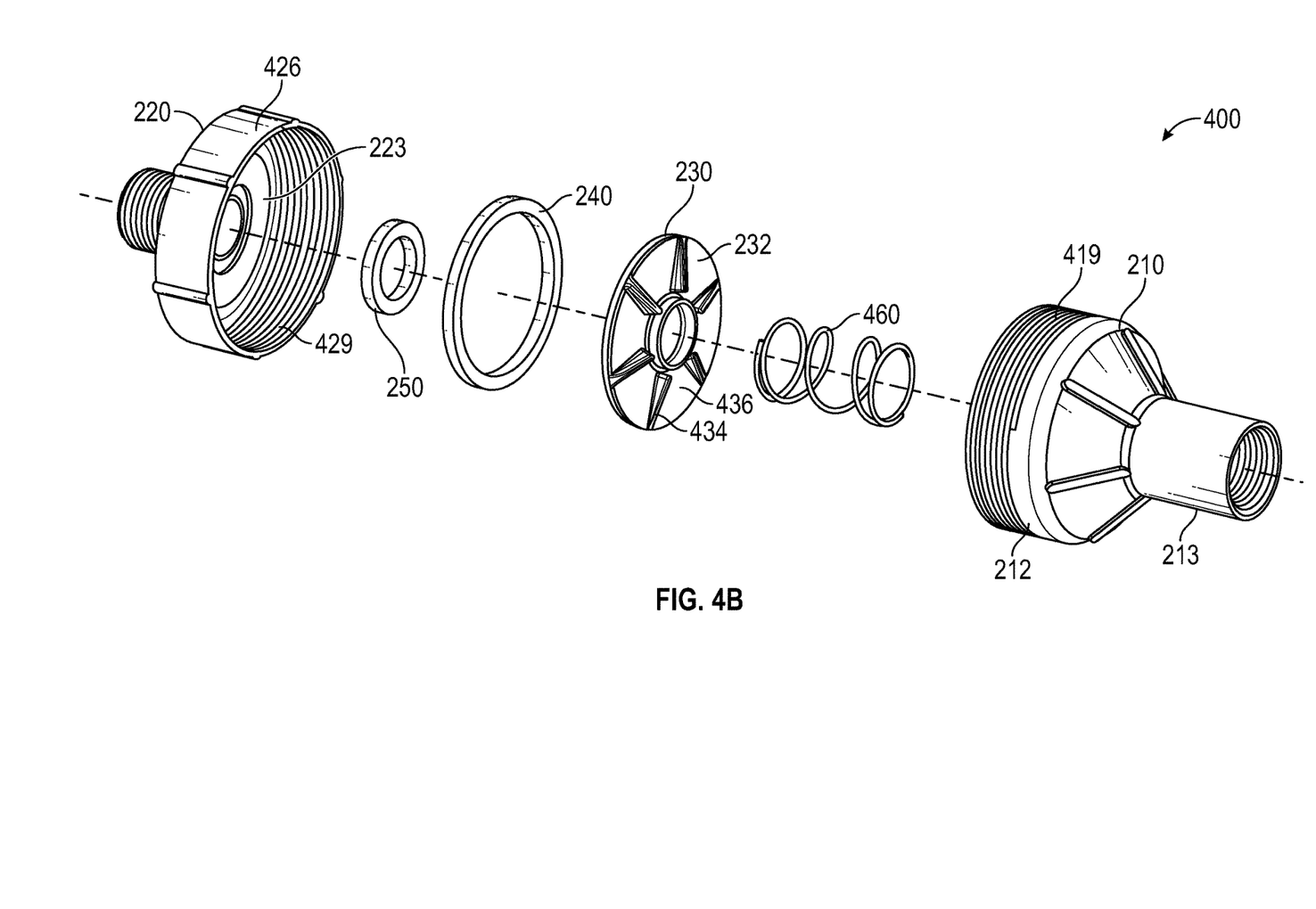
FIG. 4B is an exploded diagram of another alternative fuel demand valve according to another embodiment of the present disclosure.

FIG. 4B shows an exploded diagram of another alternative fuel demand valve 400 that may be used in the fuel system 100 according to the present disclosure. The fuel demand valve 400 includes the outlet housing 210 with at least part of the widened portion 212 covered with threads 419 on the outside for mating with the inlet housing 220. The inlet housing 220 is modified to include a circular wall 426 that extends beyond the shelf 223. The circular wall 426 includes interior threads 429 configured to mate with the threads 419. The fuel demand valve 400 includes the small gasket 250, the large gasket 240, and the valve door 230; however, the opposite side 232 is shown with optional raised radiating segments 434 and an optional circular wall 436 extending from the opposite side 232. In some embodiments, the raised radiating segments 434 may provide stiffening (e.g. prevent flex) of the valve door 230. It is also contemplated that different or additional stiffening elements to the raised radiating segments 434 may be present on the opposite side 232. In some embodiments, the circular wall 436 and the radiating segments 434 maybe dimensioned to receive one end of a spring 460.

Figure 5:
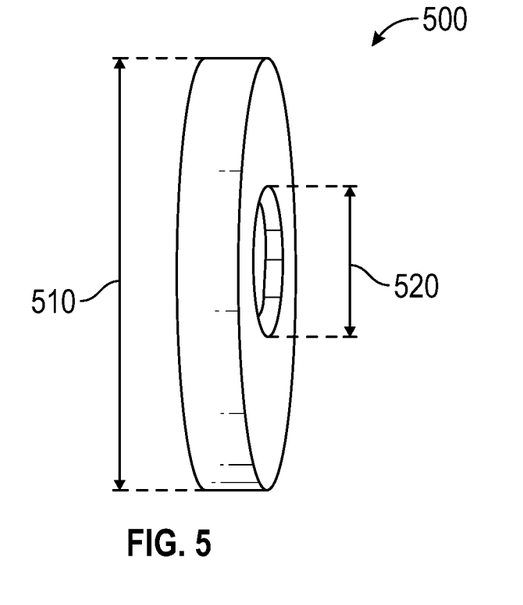
FIG. 5 is diagram of an alternative gasket for use the fuel demand valves of FIGS. 2, 3, and 4 according to one embodiment of the present disclosure.

FIG. 5 shows a 3-D diagram of a gasket 500 that may be used in place of the large gasket 240 and the small gasket 250 in any of the fuel valve 110 embodiments. The gasket 500 has an outer perimeter 510, similar to the outer perimeter 235, to define the surface area $SA_L$ on the flat side 231 of the valve door 230. The gasket 500 also has an inner perimeter 520, similar to the inner perimeter 325, to define the surface area $SA_S$ on the flat side 231 of the valve door 230. The gasket 500 may be of any shape, the outer perimeter 510 may or may not be concentric or have common center with the inner perimeter 520.

Figure 6:
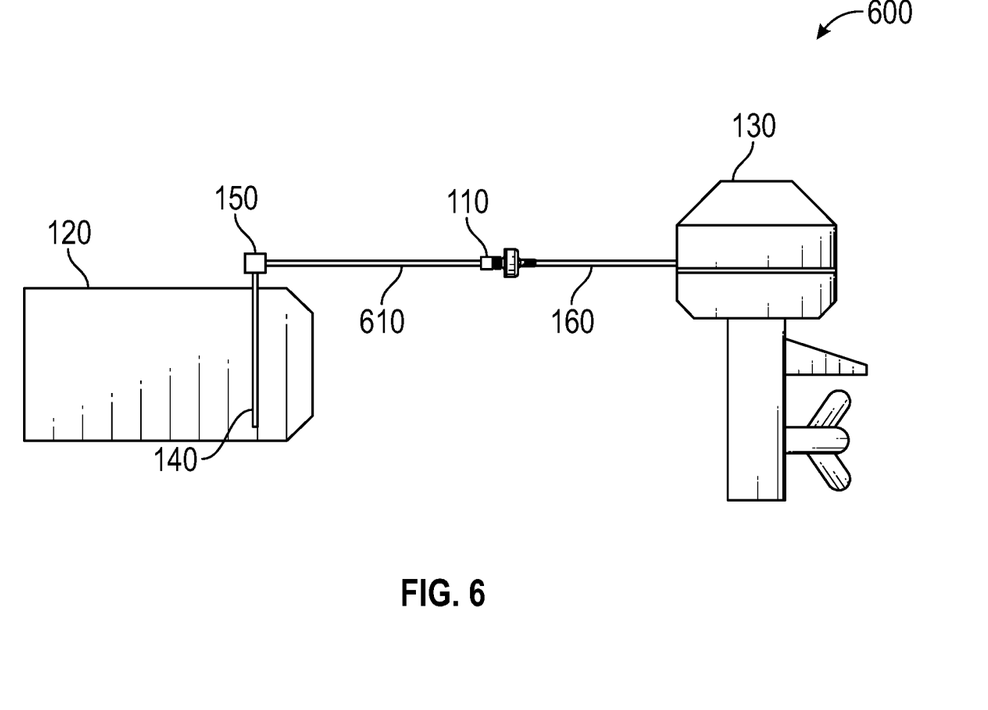
FIG. 6 is diagram of an alternative fuel system including a fuel demand valve according to one embodiment of the present disclosure.

FIG. 6 shows a diagram of a fuel system 600 with the fuel demand valve 110 disposed between a pressurized fuel tank 120 and an engine 130. The fuel demand valve 300, 400 may be used as alternatives to the fuel demand valve 110. The fuel demand valve 110 is in-line with a fuel line 610 that is in fluid communication with the pressurized fuel tank 120. In this embodiment, the fuel demand valve 110 is disposed between the fuel line 610 and the engine 150. The fuel line 610 is in fluid communication with the pressurized fuel tank 120 through the pick-up tube 140 and the threaded connector 150.

While embodiments in the present disclosure have been described in some detail, according to the preferred embodiments illustrated above, it is not meant to be limiting to modifications such as would be obvious to those skilled in the art.

The foregoing disclosure and description of the disclosure are illustrative and explanatory thereof, and various changes in the details of the illustrated apparatus and system, and the construction and the method of operation may be made without departing from the spirit of the disclosure.

What is claimed is:

1. An apparatus for controlling fuel flow, comprising:
   an inlet housing with an inlet tunnel and a shelf on one side and an opening to receive fuel on another side;
   an outlet housing comprising:
      a widened portion defining a housing chamber and configured to align with the shelf of the inlet housing; and
      a line portion configured to mate with an engine fuel line;
   a valve door with a flat side and an opposite side disposed within the housing chamber with a valve door perimeter;
   a large gasket disposed between the shelf and the valve door with a large gasket inner perimeter and a large gasket outer perimeter, wherein the large gasket outer perimeter is equal to or less than the valve door perimeter;
   a small gasket disposed between the shelf and the valve door with a small gasket outer perimeter that is less than the large gasket inner perimeter and a small gasket inner perimeter that equal to a perimeter of the inlet tunnel; and
   a spring disposed between the opposite side of the valve door and the line portion of the outlet housing.

2. The apparatus of claim 1, wherein the outlet housing is threaded, and the inlet housing comprises a circular wall extending from the shelf that is threaded to mate with the outlet housing.

3. The apparatus of claim 1, wherein the large gasket outer perimeter defines a large gasket surface area on the valve door and the small gasket inner perimeter defines a small gasket surface area on the valve door such that the ratio of the large gasket surface area to the small gasket surface area is at least 2.

4. The apparatus of claim 1, wherein the inlet housing and the outlet housing are both made of plastic.

5. The apparatus of claim 1, wherein the spring is selected based on an operating design pressure of a fuel supply in fluid communication with the inlet housing.

6. The apparatus of claim 1, wherein the inlet tunnel is cylindrical throughout the inlet housing.

7. The apparatus of claim 1, wherein the valve door is circular in shape.

8. A fuel system comprising:
a fuel supply;
a fuel demand valve in fluid communication with the fuel supply; and
an engine in fluid communication with the fuel demand valve;
wherein the fuel demand valve comprises:
an inlet housing with an inlet tunnel and a shelf on one side and an opening to receive fuel on another side;
an outlet housing comprising:
  a widened portion defining a housing chamber and configured to align with the shelf of the inlet housing; and
  a line portion configured to mate with an engine fuel line;
a valve door with a flat side and an opposite side disposed within the housing chamber with a valve door perimeter;
a large gasket disposed between the shelf and the valve door with a large gasket inner perimeter and a large gasket outer perimeter, wherein the large gasket outer perimeter is equal to or less than the valve door perimeter;
a small gasket disposed between the shelf and the valve door with a small gasket outer perimeter that is less than the large gasket inner perimeter and a small gasket inner perimeter that equal to a perimeter of the inlet tunnel; and
a spring disposed between the opposite side of the valve door and the line portion of the outlet housing.

9. The apparatus of claim 8, wherein the outlet housing is threaded, and the inlet housing comprises a circular wall extending from the shelf that is threaded to mate with the outlet housing.

10. The apparatus of claim 8, wherein the large gasket outer perimeter defines a large gasket surface area on the valve door and the small gasket inner perimeter defines a small gasket surface area on the valve door such that the ratio of the large gasket surface area to the small gasket surface area is at least 2.

11. The apparatus of claim 8, wherein the inlet housing and the outlet housing are both made of plastic.

12. The apparatus of claim 8, wherein the spring is selected based on an operating design pressure of a fuel supply in fluid communication with the inlet housing.

13. The apparatus of claim 8, wherein the inlet tunnel is cylindrical throughout the inlet housing.

14. The apparatus of claim 8, wherein the valve door is circular in shape.

15. An apparatus for controlling fuel flow, comprising:
an inlet housing with an inlet tunnel and a shelf on one side and an opening to receive fuel on another side;
an outlet housing comprising:
  a widened portion defining a housing chamber and configured to align with the shelf of the inlet housing; and
  a line portion configured to mate with an engine fuel line;
a valve door with a flat side and an opposite side disposed within the housing chamber with a valve door perimeter;
a gasket disposed between the shelf and the valve door with a gasket outer perimeter and an opening with a gasket inner perimeter, wherein the gasket outer perimeter is equal to or less than the valve door perimeter, and wherein the gasket inner perimeter is equal to a perimeter of the inlet tunnel;
and
a spring disposed between the opposite side of the valve door and the line portion of the outlet housing.

16. The apparatus of claim 15, wherein the outlet housing is threaded, and the inlet housing comprises a circular wall extending from the shelf that is threaded to mate with the outlet housing.

17. The apparatus of claim 15, wherein the gasket outer perimeter defines a gasket surface area on the valve door and the opening defines an opening surface area on the valve door such that the ratio of the gasket surface area to the opening surface area is at least 2.

18. The apparatus of claim 15, wherein the inlet housing and the outlet housing are both made of plastic.

19. The apparatus of claim 15, wherein the spring is selected based on an operating design pressure of a fuel supply in fluid communication with the inlet housing.

20. The apparatus of claim 15, wherein the inlet tunnel is cylindrical throughout the inlet housing.

* * * * *